US008589403B2

(12) United States Patent
Marquardt et al.

(10) Patent No.: US 8,589,403 B2
(45) Date of Patent: Nov. 19, 2013

(54) COMPRESSED JOURNALING IN EVENT TRACKING FILES FOR METADATA RECOVERY AND REPLICATION

(75) Inventors: David Ryan Marquardt, San Francisco, CA (US); Mitchell Neuman Blank, Jr., San Francisco, CA (US); Stephen Sorkin, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 78 days.

(21) Appl. No.: 13/037,279

(22) Filed: Feb. 28, 2011

(65) Prior Publication Data
US 2012/0221576 A1 Aug. 30, 2012

(51) Int. Cl.
G06F 17/30 (2006.01)

(52) U.S. Cl.
USPC .............................................. 707/741; 706/25

(58) Field of Classification Search
USPC ................. 707/610, 201, 646, 100, 737, 692; 715/200; 706/25; 1/1
See application file for complete search history.

(56) References Cited

U.S. PATENT DOCUMENTS

| | | | | |
|---|---|---|---|---|
| 7,433,898 | B1 * | 10/2008 | Georgiev | 1/1 |
| 7,461,092 | B1 * | 12/2008 | Sigel et al. | 1/1 |
| 7,552,148 | B2 * | 6/2009 | Liu et al. | 1/1 |
| 7,577,667 | B2 * | 8/2009 | Hinshaw et al. | 1/1 |
| 7,634,507 | B2 * | 12/2009 | Atluri et al. | 1/1 |
| 7,647,327 | B2 | 1/2010 | Aguren | |
| 7,719,443 | B1 | 5/2010 | Natanzon | |
| 7,844,643 | B2 | 11/2010 | Judd | |
| 7,949,678 | B2 * | 5/2011 | Kunjithapatham et al. | 707/781 |
| 8,090,683 | B2 * | 1/2012 | Beaman et al. | 707/610 |
| 8,176,408 | B2 * | 5/2012 | Ammerlaan et al. | 715/200 |
| 8,260,751 | B2 * | 9/2012 | Johnson et al. | 707/649 |
| 8,271,447 | B1 * | 9/2012 | Natanzon et al. | 707/660 |
| 8,412,682 | B2 * | 4/2013 | Zheng et al. | 707/687 |
| 2007/0174580 | A1 * | 7/2007 | Shulga | 711/170 |
| 2007/0198550 | A1 * | 8/2007 | Irving et al. | 707/100 |
| 2007/0198601 | A1 * | 8/2007 | Prahlad et al. | 707/201 |
| 2009/0024619 | A1 | 1/2009 | Dallmeier et al. | |
| 2010/0146013 | A1 * | 6/2010 | Mather | 707/803 |
| 2010/0153399 | A1 * | 6/2010 | Oliver et al. | 707/737 |
| 2012/0197844 | A1 * | 8/2012 | Wang et al. | 707/646 |
| 2013/0036117 | A1 * | 2/2013 | Fisher et al. | 707/736 |

OTHER PUBLICATIONS

"Log-Structure file system," Wikipedia, the free encyclopedia, accessed Apr. 5, 2011, 3 pages http://en.wikipedia.org/wiki/Log_structured_file_systems.

(Continued)

Primary Examiner — James Trujillo
Assistant Examiner — Thong Vu
(74) Attorney, Agent, or Firm — Kilpatrick Townsend & Stockton LLP

(57) ABSTRACT

Embodiments are directed towards employing compressed journaling for event tracking files for metadata recovery and replication. Event data and related metadata are received from one or more client devices. When a feature within the received metadata is detected that is previously unwritten to a journal, then the previously unwritten feature is written to the journal. Further, any feature is detected for the received event data that is determined to be different from a feature associated with an immediately preceding event data that is written in the journal, then the detected different feature is identified in the journal. In one embodiment, the identification employs writing to the journal an effective feature record that may employ indices identifying the different feature. The received event data is also written to the journal and may further employ string arguments to minimize recording of redundant information into the journal.

18 Claims, 9 Drawing Sheets

(56) References Cited

OTHER PUBLICATIONS

International Search Report and Written Opinion in PCT/US2012/026798 dated Aug. 29, 2012.

International Preliminary Report on Patentability for PCT Application No. PCT/US2012/026798, mailed Sep. 12, 2013, 5 pages.

* cited by examiner

COMPRESSED JOURNALING IN EVENT TRACKING FILES FOR METADATA RECOVERY AND REPLICATION

TECHNICAL FIELD

The present invention relates generally to data storage and, more particularly, but not exclusively to compressed journaling of event data and related metadata characterizing the event data to enable subsequent recovery and/or replication of the metadata.

BACKGROUND

Today, many companies perform business-related activities on a variety of different computer systems that can range from a single computer for a small company to a collection of servers and a plurality of user computer nodes for a large corporation. Business-related activities create the backbone of a company's information technology (IT) operation, and can include almost any computer use, including sending and receiving emails, creating and storing documents, hosting web sites, facilitating online transactions, or the like. Therefore, any system errors or failures that are not quickly detected and resolved can percolate throughout the system and can cause great financial hardship to a company. Thus, it is desirable that troubleshooting system errors be fast and efficient. Similarly, a company may want to monitor the performance of its computer systems and networks to prevent errors from occurring, as well as to look for inefficiencies in its system, and/or other opportunities for improvement in their computing system.

Troubleshooting errors and monitoring system performance generally involves analyzing large amounts of data. Stored data can be retrieved and analyzed at or near real time or in the future. However, as noted above, it is desirable for the data to be quickly retrievable to allow for quick analysis and/or to minimize any impacts caused by errors. As a result, it is desirable that data be stored in a way that allows the data to be retrieved quickly, while including enough information to be useful for troubleshooting and/or analysis.

Partitioning the data into multiple files sometimes allows for fast and efficient searching, retrieving, analyzing, and/or maintaining large amounts of data. In some environments, multiple data files can be separated based on a type and/or category of data. However, if any one of the multiple data files is deleted, lost, corrupted, or otherwise inaccessible, then the remaining data may become virtually useless. Therefore, there is a need for fast and efficient data searching and retrieval, as well as maintaining and/or recovering lost data. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
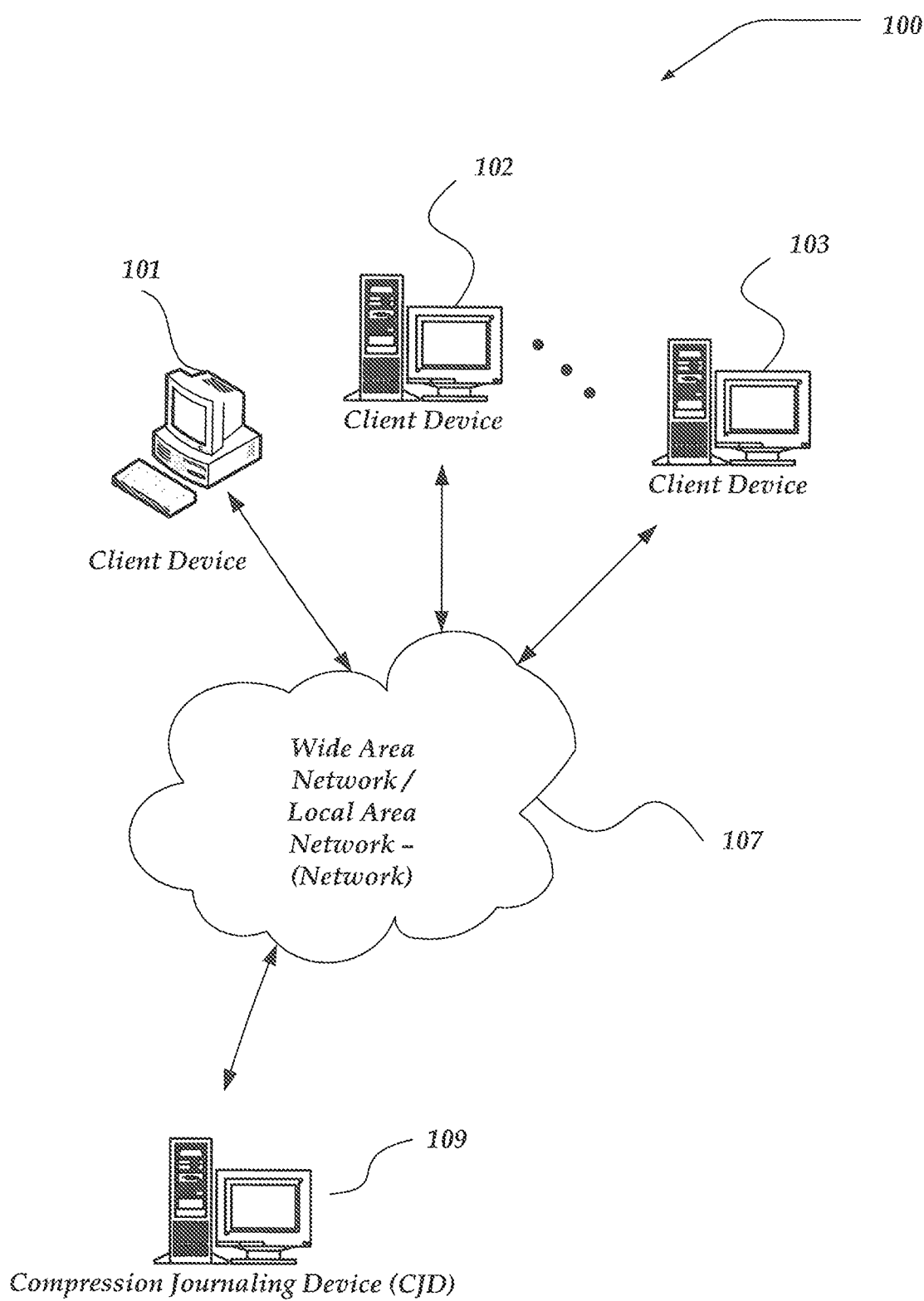
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "event data" refers to computing data that is collected about an event for a computing system, including, for example, an action, characteristic, condition (or state) of the computing system. For example, such events may be about a computing system's performance, actions taken by the computing system, or the like. Event data may be obtained from various computing log files generated by the computer's operating system, and/or other monitoring application. However, event data is not restricted by a file format or structure from which the event data is obtained. In one embodiment, event data may have metadata associated with it.

As used herein, the term "metadata" refers to a plurality of features that characterize event data. Such metadata includes, for example, a computer host from which the event data is obtained, or otherwise associated with; a timestamp associated with the event data; a file name or source name with which the event data is associated; a source type for the event data; and the like. A source type may refer to whether the event data is from a log file, a word processing document, or some other type of file type.

As used herein, the term "journal" refers to a collection or sequence of information about at least event data in one or more compressed and/or uncompressed files. Included within the journal as described herein is metadata about event data in a compact structure such that one or more metadata files and/or search indices can be recovered and/or replicated to a current state or a previous state using the journal. In one embodiment, the journal provides a sequential record of received event data, where, as event data is received, it is 'appended' within the journal, along with related metadata, in a manner as described further below. It should be noted that while various example structures for the journal, related, files, and indices are discussed, the invention is not constrained to a particular structure or format, and other structures or formats may also be employed that embody the compactness of journaling as described within.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards compressed journaling of event data and related metadata characterizing the event data to enable subsequent recovery and/or replication of the metadata. Journaling of the received data is directed towards a unique approach to managing the event data and its related metadata that enables efficient storage of the received event data and metadata into a compressed journal. The compressed journal may then be employed to rapidly replicate and recover metadata files at a subsequent time and/or location.

As event data and related metadata are received, event data is stored in a journal and a determination is made whether the features within the metadata are previously unwritten to the journal. If so, then any previously unwritten feature is written to the journal. If the features have been received before, then a determination is made whether the features are the same as features associated with an immediately preceding event data that was written into the journal. If not, then a difference in the metadata features is identified in the journal; otherwise, the metadata may be ignored, or otherwise inhibited from being written into the journal. In this manner, redundant metadata is not stored in the journal, resulting in a journal that is directed towards an efficient storage of event data and its associated metadata. In one embodiment, the journal may be compressed and concatenated with another journal that may also be compressed, thereby generating a concatenation of compressed journals.

In one embodiment, the compressed journal may be employed to recover and/or replicate one or more metadata files and/or a search index. Data obtained from the compressed journal may be evaluated to determine whether the data is different metadata feature from other metadata feature obtained from the compressed journal during recovery or replication efforts. If the metadata feature is different, then the different feature is recorded in a corresponding metadata file. Data obtained from the compressed journal that is determined to be event data may also be employed to replicate another compressed journal and to further update a search index.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 107, client devices 101-103, and Compression Journaling Device (CJD) 109.

One embodiment of client devices 101-103 is described in more detail below in conjunction with FIG. 2. Generally, however, client devices 101-103 may include virtually any computing device capable of communicating over a network to send and receive information, including event data and related metadata, performing various online activities, offline actions, or the like. In one embodiment, one or more of client devices 101-103 may be configured to operate within a business or other entity to perform a variety of services for the business or other entity. For example, client devices 101-103 may be configured to operate as a web server, an accounting server, a production server, an inventory server, or the like. However, client devices 101-103 are not constrained to these services and may also be employed, for example, as an end-user computing node, in other embodiments. Further, it should be recognized that more or less client devices may be included within a system such as described herein, and embodiments are therefore not constrained by the number or type of client devices employed.

The set of such devices may include devices that typically connect using a wired or wireless communications medium such as personal computers, servers, multiprocessor systems, microprocessor-based or programmable consumer electronics, network PCs, or the like. In one embodiment, at least some of client devices 101-103 may operate over wired and/or wireless network. In some embodiments, client devices 101-103 may include virtually any portable computing device capable of receiving and sending a message over a network, such as network 107.

Client devices 101-103 also may include at least one other client application that is configured to receive and/or send data, including event data and/or related metadata, between another computing device. The client application may include a capability to provide and/or to receive requests for event data and/or related metadata, or the like. However, the client application need not be limited to merely providing event data and related metadata, and may also provide other information, and/or provide for a variety of other services, including, for example, monitoring for events within and/or between client devices.

The client application may further provide information that identifies itself, including a type, capability, name, and the like. Such information may be provided in a network packet, or the like, sent between other client devices, CJD 109, or other computing devices.

Client devices 101-103 may further be configured to include a client application that enables an end-user to log into an end-user account that may be managed by another computing device, such as CJD 109, or the like. Such end-user account, in one non-limiting example, may be configured to enable the end-user to search for event data located in a compressed journal, or the like. However, participation in such activities may also be performed without logging into the end-user account.

Network 107 is configured to couple network devices with other computing devices, including, CJD 109, and client devices 101-103. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiments, network 107 may be further configurable as a wireless network, which may further employ a plurality of access technologies including 2nd (2G), 3rd (3G), 4th (4G) generation radio access for cellular systems, WLAN, Wireless Router (WR) mesh, and the like. In one non-limiting example, network 107, when configured as a wireless network, may enable a radio connection through a radio network access such as Global System for Mobile communication (GSM), General Packet Radio Services (GPRS), Enhanced Data GSM Environment (EDGE), Wideband Code Division Multiple Access (WCDMA), and the like.

CJD 109 includes virtually any network device usable to operate to receive and/or analyze event data from client devices 101-103. CJD 109 may, for example, be configured to perform compressed journaling of the received event data and related metadata characterizing the event data. In one embodiment, a compressed journal, and various index files may be created by CJD 109. In one embodiment, the compressed journal may be a concatenation of a plurality of compressed journals that include event data and efficiently compressed (e.g., non-redundant) metadata information. The compressed journal may be employed by one or more other applications to analyze various events described by the event data. CJD 109 or another network device may employ the compressed journal to recover, replicate, or otherwise create one or more index files, including a file for the metadata. CJD 109 may employ processes such as described below in conjunction with FIGS. 4-9 to perform at least some of its actions.

Devices that may operate as CJD 109 include various network devices, including, but not limited to personal computers, desktop computers, multiprocessor systems, microprocessor-based or programmable consumer electronics, network PCs, server devices, network appliances, and the like.

Although FIG. 1 illustrates CJD 109 as a single computing device, the invention is not so limited. For example, one or more functions of the CJD 109 may be distributed across one or more distinct network devices. Moreover, CJD 109 is not limited to a particular configuration. Thus, in one embodiment, CJD 109 may contain a plurality of network devices to perform compressed journaling and/or replication or recovery. Similarly, in another embodiment, CJD 109 may contain a plurality of network devices that operate using a master/slave approach, where one of the plurality of network devices of CJD 109 operates to manage and/or otherwise coordinate operations of the other network devices. In other embodiments, the CJD 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
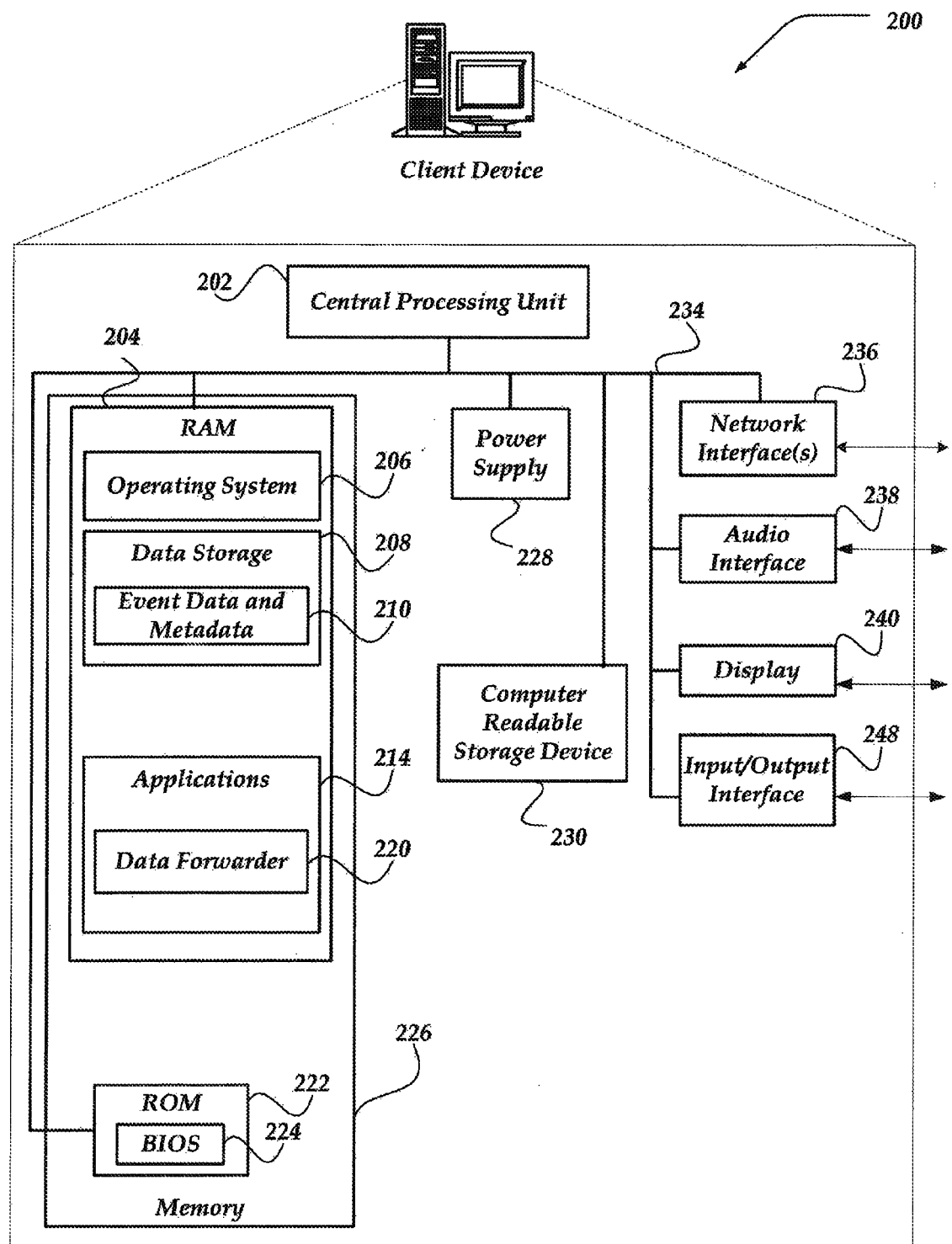
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-103 of FIG. 1.

As shown in the figure, client device 200 includes processing unit (CPU) 202 in communication with a mass memory 226 via a bus 234. Client device 200 also includes a power supply 228, one or more network interfaces 236, an audio interface 238, a display 240, and an input/output interface 248. Power supply 228 provides power to client device 200.

Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Client device 200 also comprises input/output interface 248 for communicating with external devices, such as a keyboard, or other input or output devices not shown in FIG. 2. Input/output interface 248 can utilize one or more communication technologies, such as USB, infrared, Bluetooth™, or the like.

Mass memory 226 includes a RAM 204, a ROM 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device 230 within client device 200. Data storage 208 may further store event data and metadata 210. Such event data and metadata 210 may also be stored within any of a variety of other computer-readable storage devices, including, but not limited to a hard drive, a portable storage device, or the like, such as illustrated by computer-readable storage device 230.

Applications 214 may include computer executable instructions which, when executed by client device 200, transmit, receive, and/or otherwise process network data. Other examples of application programs include calendars, search programs, email clients, IM applications, SMS applications, VOIP applications, contact managers, task managers, transcoders, database programs, word processing programs, security applications, spreadsheet programs, games, search programs, data log recording programs, and so forth. Applications 214 may include, for example, data forwarder 220. Data forwarder 220 is configured to send data, such as event data and metadata 210 to another network device, such as CJD 109 of FIG. 1. The event data and metadata 210 may be sent to CJD 109 based on a request from CJD 109, or other network device. However, the event data and metadata 210 may also be sent based on a time, change in a state of client device 200, or any of a variety of other criteria.

Illustrative Network Device

Figure 3:
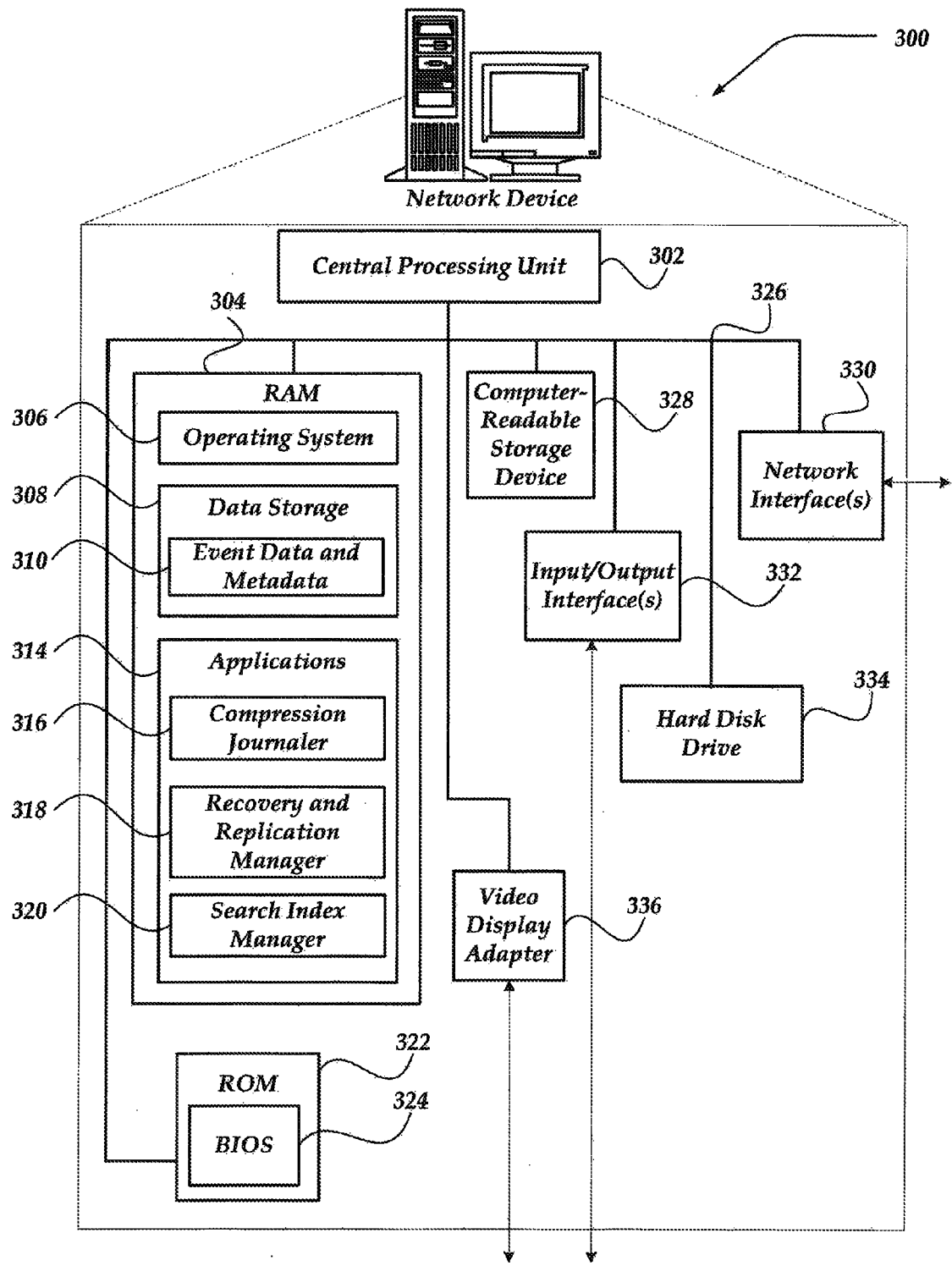
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example CJD 109 of FIG. 1.

Network device 300 includes processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to computer-readable storage medium 328, hard disk drive 334, or the like. Data storage 308 may further store event data and metadata 310.

Event data and metadata 310 may include event data and/or related metadata received from another network device, such as client device 200 of FIG. 2. Data Storage 308 may further store a compressed journal, one or more metadata files, search index, compression index or the like, which are described below in conjunction with FIGS. 4-7.

The mass memory also stores program code and data. One or more applications 314 are loaded into mass memory and run on operating system 306. Examples of application programs may include transcoders, schedulers, calendars, database programs, word processing programs, HTTP programs, customizable user interface programs, IPSec applications, encryption programs, security programs, SMS message servers, account managers, and so forth. Compression journaler 316, Recover and Replication Manager (RRM) 318, and search index manager 320, may also be included as application programs within applications 314.

Compression journaler 316 may include virtually any computing component or components configured and arranged manage and record event data and its related metadata into a compressed journal. In one embodiment, compression journaler 316 may receive the event data and related metadata in real time, and perform compressed journaling as quickly as the data (event data and related metadata) are received. The compressed journal may then be employed by RRM 318 to replicate and/or recover metadata files at a subsequent time and/or location. In one embodiment, compression journaler 316 may perform actions such as those described below in conjunction with FIGS. 4-5. Additionally, compression journaler 316 may perform portions of those actions described below in conjunction with FIGS. 6-7.

RRM 318 may be configured and arranged to employ a compressed journal to recover and/or replicate one or more metadata files, and/or a search index. In one embodiment, RRM 318 may perform actions such as those described below in conjunction with FIG. 7.

Search index manager 320 may be configured and arranged to manage a search index to allow for retrieval of event data from a compressed journal and/or related metadata from one or more metadata files. In any event, search index manager 320 may perform portions of those actions described below in conjunction with FIG. 6.

General Operation

Figure 4:
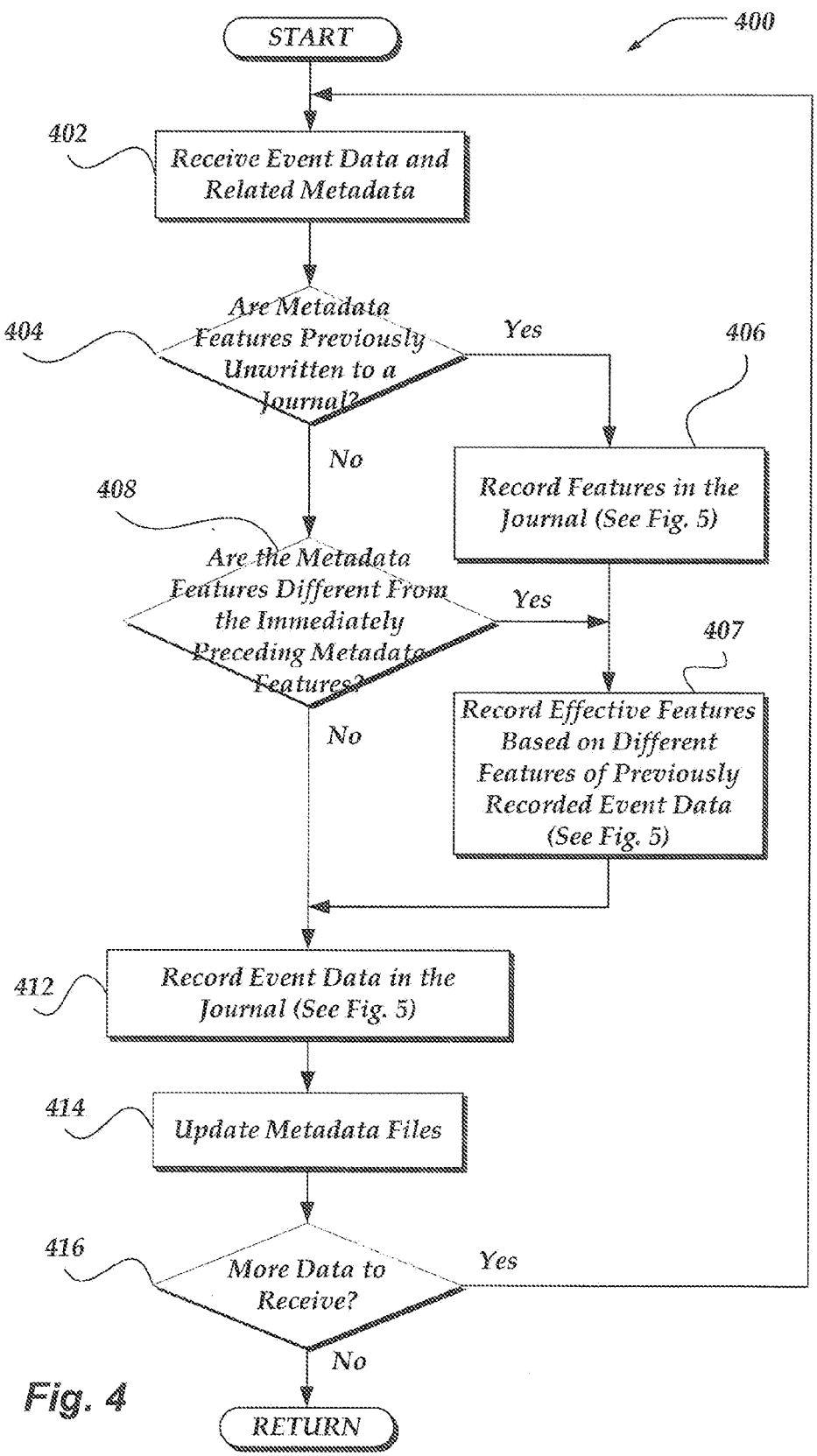
FIG. 4 illustrates a logical flow diagram generally showing one embodiment of an overview process for generating a compressed journal of event data and related metadata.

The operation of certain aspects of the invention will now be described with respect to FIGS. 4-7. FIG. 4 illustrates a logical flow diagram generally showing one embodiment of an overview process for generating a compressed journal of event data and related metadata for metadata recovery and replication. A non-exhaustive, non-limiting, example illustration of process 400 is also described below in conjunction with FIGS. 8-9. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, where event data and related metadata is received. In some embodiments, the metadata may include a single feature or a plurality of features that characterize the corresponding event data. In one embodiment, a plurality of features may include a host, a source, a source type, a timestamp, or the like. In one embodiment, the host may be the network device that provided the event data. In one embodiment, the source may be the file that contains the event data, such as "blah.txt." In one embodiment, the source type may be the type of file that contains the event data, such as a log file. In one embodiment, the timestamp may be a time indicating when the event was recorded by the host. However, the timestamp is not constrained to when it was recorded by the host computing system, and may represent any of a variety of other events. It is noted that these types of features are examples of metadata features and should not be construed as exhaustive or limiting. Rather, any suitable metadata feature known to those skilled in the art may be received, such as, for example, a size of the event data.

Moreover, the event data and related metadata may be received in real-time. However, the invention is not constrained to such configuration and the event data and related metadata may be stored, and provided based on some condition, time expiration, or the like.

In some embodiments, the event data and the related metadata may be received as a single piece of data. In other embodiments, the event data and the related metadata may be received separately. Moreover, in some embodiments, the event data may be received one event at a time, such as from a client device that may be streaming the event data at or in real time. In other embodiments, event data may be received as a file that includes a plurality of events.

In any event, processing continues to decision block 404, where a determination is made whether the received features were previously unwritten to a journal. In one embodiment, the journal is sometimes referred to as a raw data journal, indicating that the event data is 'raw data.' In some embodiments, previously unwritten features may be determined based on a comparison of the received metadata and information stored in one or more metadata files, or the like. One embodiment of generating and/or updating the one or more metadata files is described in more detail below in conjunction with block 414 of FIG. 4. If it is determined that a received metadata feature is previously unwritten to the journal, then processing flows to block 406; otherwise, processing flows to decision block 408.

At block 406, the previously unwritten feature is written in the compressed journal. The writing of data in the journal is described in more detail below in conjunction with FIG. 5. Briefly, however, data, such as the previously unwritten feature, is recorded in an uncompressed file (uncompressed journal) before it is compressed and concatenated onto a compressed journal. Additionally, in some embodiments, metadata may include at least one string argument, such that if it is detected that the string argument is previously unwritten to the journal, then the previously unwritten string argument may be written to the journal. Processing then flows to block 407, where a feature for the event data that is different from a feature associated with an immediately preceding event data that is written into the journal is identified in the journal. In one embodiment, the identified feature may be written to the journal as a record of effective features associated with the event data. Recording data, including the different features, in the journal is described in more detail below in conjunction with FIG. 5. Processing then continues to block 412.

However, at decision block 408, a determination is made whether the received metadata is different from the immediately preceding metadata for immediately preceding event data in the journal. In one embodiment, a record may be maintained that includes metadata corresponding to preceding event data. Therefore, metadata relating to the preceding event data may be compared with the currently received metadata to determine whether the received metadata is different from the immediately preceding metadata. Thus, if any one of a plurality of features in the metadata is detected as having changed or is different from a corresponding feature associated with an immediately preceding event data, then processing flows to block 407; otherwise, processing flows to block 412.

Figure 5:
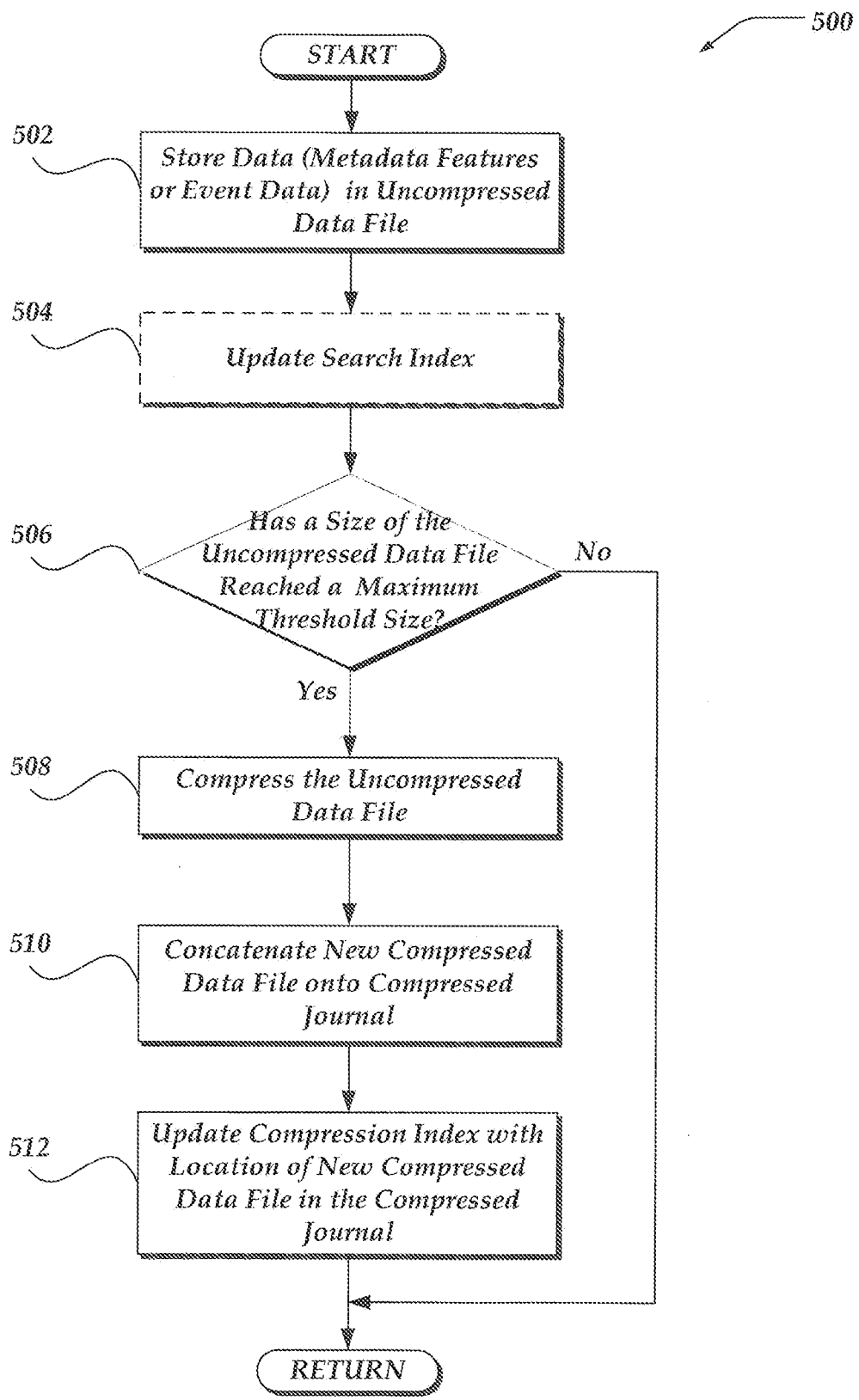
FIG. 5 illustrates a logical flow diagram generally showing one embodiment of a process for data compression of a journal.

At block 412, the received event data is written into the journal. In some embodiments, string codes may be employed to identify an associated string argument for the event data, such as by writing both the event data and string codes. Moreover, in other embodiments, event data may be written with other metadata, such as one or more user defined annotations. A user defined annotation may be other metadata and/or an identifier of some element within event data. In one embodiment, the one or more user defined annotations may be utilized in a search index, such that the event data is flagged for a user defined search. FIG. 5, described below, further describes recoding data, including the event data, in the journal. In one embodiment, the journal may be configured as a concatenation of compressed journals.

In any event, continuing to block 414, metadata files are updated. In some embodiments, previously unwritten features may be recorded in a corresponding metadata file. In some embodiments, a single metadata file may be maintained for all received metadata. In one embodiment, metadata files may be an index of features, such that a record of effective features in a compressed journal can employ indices into the index of features to identify features written to the compressed journal.

In other embodiments, a plurality of metadata files may be maintained. In one embodiment, each of the plurality of metadata files may include a different metadata feature. For example, one metadata file may include a host feature, another metadata file may include a source feature, and the like. Moreover, in another embodiment, metadata files may be updated to include a total number of events that are related to the metadata. In yet other embodiment, metadata files may include other information, such as, but not limited to, a time range of when an event that is related to the metadata occurred. An example illustration of a plurality of metadata files is described below in conjunction with FIG. 9.

Process 400 then proceeds to block 416 where a determination is made whether more data (event data and metadata) is to be received. In one embodiment, this determination may be made based on a start and/or stop time provided by a user, such as a user of client device 200 of FIG. 2. If more data is to be received, then processing 400 loops to block 402; otherwise, processing returns to a calling process to perform other actions.

FIG. 5 illustrates a logical flow diagram generally showing one embodiment of a process for data compression of a journal to generate a compressed journal. Process 500 begins, after a start block, at block 502, where data is stored in an uncompressed data file. In some embodiments, the uncompressed data file may be a portion of a compressed journal. In one embodiment, the uncompressed data file may include data received during a defined time period.

Furthermore, in some embodiments, the data may include previously unwritten features, event data, and/or effective features, such as from blocks 406, 407, and/or 412 of FIG. 4. In one embodiment, data may be appended to the uncompressed data file. Moreover, in some embodiments, each line of the uncompressed data file may include event data, one or more types of metadata, an effective features, or any combination thereof. An example illustration of how data may be stored in a journal is described below in conjunction with FIG. 8.

Process 500 then proceeds to option block 504, where a search index is optionally updated. In one embodiment, the search index may be updated with keywords that are associated with event data and related metadata. In one embodiment, the search index may include one or more metadata codes that correspond to metadata, e.g. features, stored in one or more metadata files. Similarly, the search index may include an event location offset to where the event is stored in the compressed journal. Thus, in some embodiments, the search index may be structured to perform efficient searching of keywords for associated event data. Searching for event data is described in more detail below in conjunction with FIG. 6.

Continuing next to decision block 506, a determination is made whether a size of the uncompressed data file has reached a maximum threshold size. In one embodiment, the maximum threshold size may be based on an arbitrary value. In another embodiment, the maximum threshold size may be based on a size limitation for compressing a file. For example, the maximum threshold size may be determined based on a maximum file size that can be compressed within a defined time period by compression software and/or algorithms. In yet another embodiment, the maximum threshold size may be based on an operational file size limit imposed by an operating system, a desired compression ratio, or any of a variety of other criteria. In any event, if the size of the uncompressed data file has reached a maximum threshold size, then processing flows to block 508; otherwise, processing returns to a calling process to perform other actions.

At block 508 the uncompressed data file is compressed. In some embodiments, a gzip compression format may be implemented to compress the uncompressed data file. However, virtually any compression mechanism now known or developed in the future may be employed. Proceeding next to block 510, the new compressed data file is concatenated onto a compressed journal or a journal comprising one or more previously compressed journal. In any event, this concatenated journal is herein referred to as the compressed journal.

Continuing to block 512, a compression index is updated with a location of the newly compressed data file in the compressed journal. In one embodiment, the location of the newly compressed data file may be a header location of the newly compressed data file in the compressed journal. Thus, in some embodiments, the location of the newly compressed data file may be a compressed event location offset (CELO). In one embodiment, the CELO may be an offset into the concatenated compressed data files of the compressed journal. In another embodiment, the compression index may include with location information of event data within the concatenated compressed journal, such as a mapping between the CELO and an uncompressed event location offset (UELO). Therefore, a request for event data may include a UELO, which can then be mapped to a CELO, which in turn may provide the compressed data file in the compressed journal that contains the requested event. From block 512, processing returns to a calling process to perform other actions.

Figure 6:
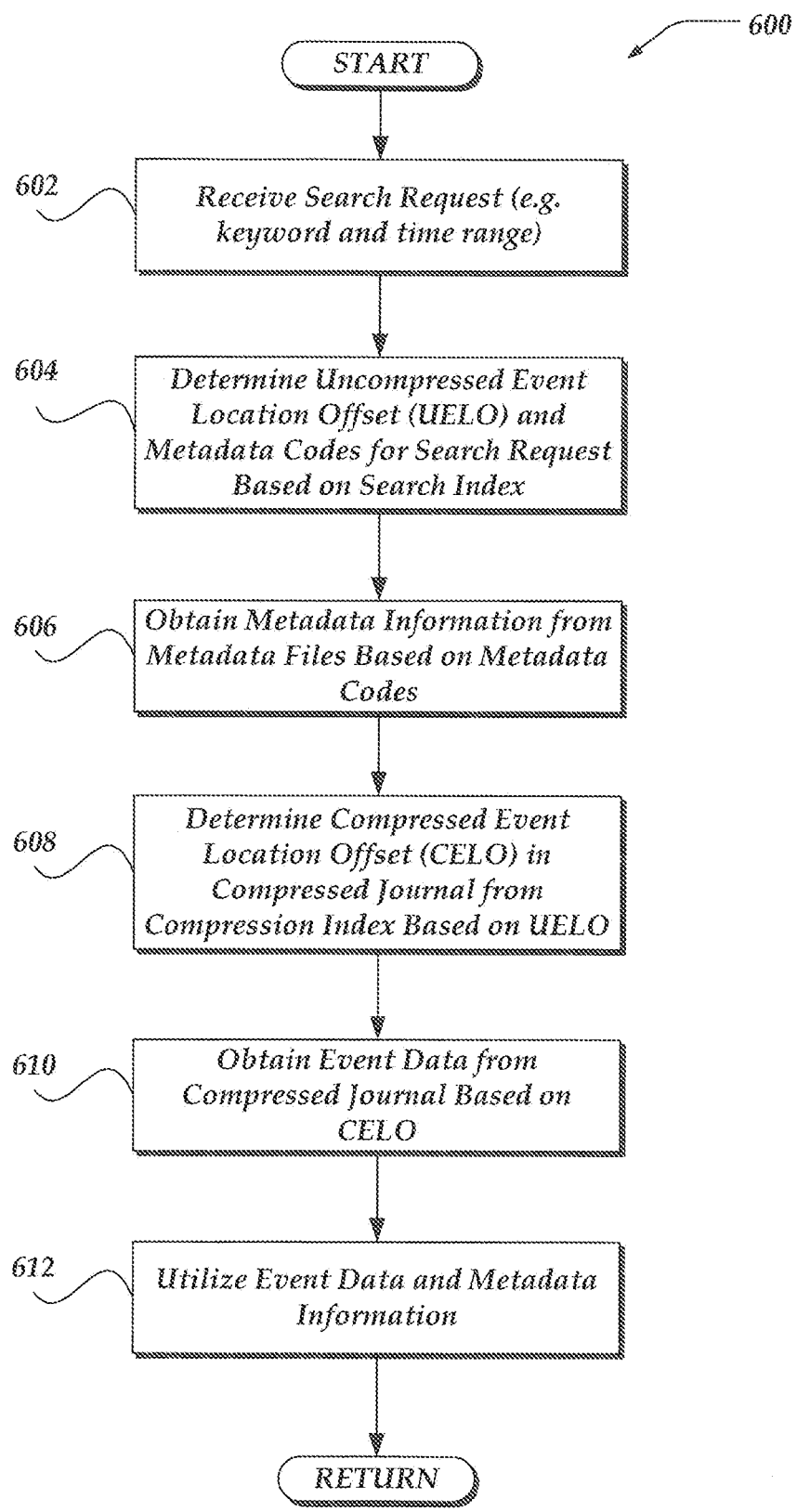
FIG. 6 illustrates a logical flow diagram generally showing one embodiment of a process for utilizing a compressed journal to obtain data in response to a search request.

FIG. 6 illustrates a logical flow diagram generally showing one embodiment of a process for utilizing a compressed journal to obtain event data in response to a search request. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 602, where a search request is received. In one embodiment, the search request may include a keyword, time range, one or more event descriptors, or the like. Event descriptors may be any information that may be used to distinguish one event data from another and/or to describe the event data, such as a size of the event data, metadata relating to an event data, or the like. In one embodiment, event descriptors may include user defined annotations that may be stored with event data. For example, a user may annotate one type of event data as important and may annotate another type of event data as unimportant, or of lesser importance.

Proceeding next to block 604, an uncompressed event location offset (UELO) and metadata codes for the search request may be determined based on a search index. In some embodiments, the search index may include a comprehensive catalog of keywords (and/or event data descriptors) and associated event data. In one embodiment, the search index may include one or more UELOs that correspond to one or more event data associated with the search request. In one embodiment, the UELO may be an offset that describes the uncompressed location of event data in a compressed journal. Additionally, in some embodiments, the metadata codes, e.g. feature codes, may correspond to metadata stored in one or more metadata files. In some embodiments, metadata codes may include one or more metadata codes.

Process 600 next proceeds to block 606, where metadata information may be obtained from one or more metadata files based on the one or more determined metadata codes from the search index. Proceeding next to block 608, a compressed event location offset (CELO) is determined based on the determined UELO. In some embodiments, a compression index may be employed to determine the CELO. In one embodiment, the compression index may include location information of event data within a concatenated compressed journal, such as a mapping between UELOs and CELOs. As described above, a search index may determine a UELO of event data in a compressed journal. However, the UELO may not correspond to the same event data in a compressed journal that contains concatenated compressed data files. Therefore, the UELO may be mapped to a CELO in the compression index, which may provide the location of the event data in the compressed journal. In one embodiment, the CELO may correspond to a header of a compressed data file in the compressed journal. In some embodiments, a CELO may not be determined if the event data can be found in an uncompressed data file (uncompressed journal) of the compressed journal using the UELO.

Continuing to block 610, event data is obtained from the compressed journal based on the CELO. In one embodiment, the CELO may be an offset to a header of a compressed data file in the compressed journal, such as when the compressed journal is a concatenation of compressed data files. Thus, in one embodiment, the compressed data file in the compressed journal may be decompressed to obtain the event data. As a result, other portions of the compressed journal may not be decompressed. In one embodiment, once the corresponding compressed data file is decompressed, the UELO may be utilized to locate the event data. In some embodiments, the event data may be obtained from the compressed journal based on the UELO if the event data is located in an uncompressed data file in the compressed journal.

Process 600 then proceeds to block 612, where the obtained event data and the obtained related metadata information may be utilized. In one embodiment, the event data and the metadata information may be provided to a user, such as a user of a client device of FIG. 1. In another embodiment, utilization of the event data and/or related metadata may provide metrics of an event, such as a frequency of the event. After block 612, process 600 may return for a calling process to perform other actions.

Figure 7:
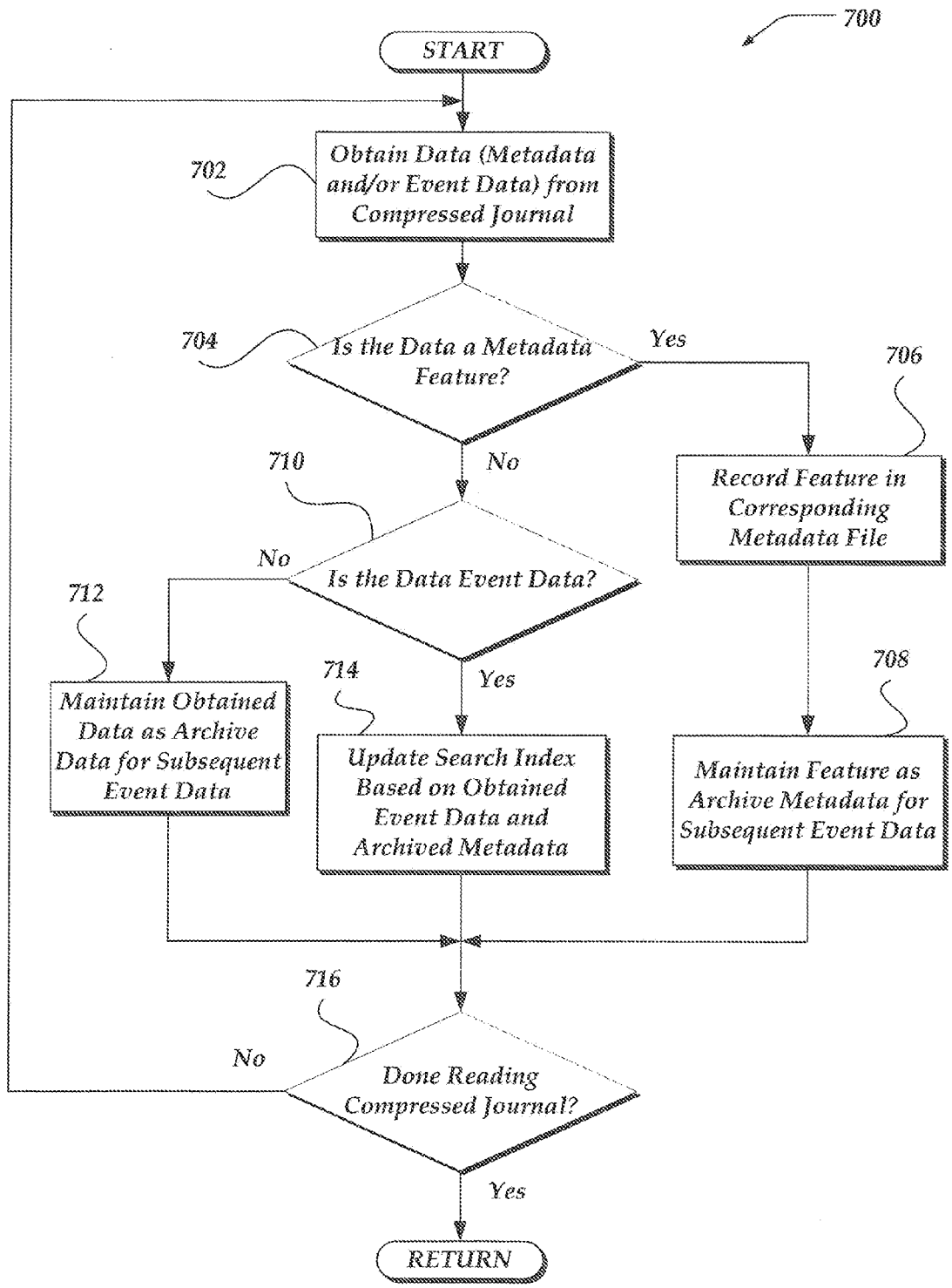
FIG. 7 illustrates a logical flow diagram generally showing one embodiment of a process for recovering and/or replicating metadata files from a compressed journal.

FIG. 7 illustrates a logical flow diagram generally showing one embodiment of a process for recovering and/or replicating one or more metadata files from a compressed journal, such as the one generated by employing process 400 of FIG. 4. Although, FIG. 7 is described with reference to a compressed journal, the invention is not so limited. Rather, recovering and/or replicating one or more metadata files may be employed from uncompressed data, including a journal. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 702, where data is obtained from a compressed journal. In one embodiment, the data may include metadata (which may include one or more features), event data, effective features, or any combination thereof. In some embodiments, the data may be obtained from the compressed journal one data line at a time. In other embodiments, the data from a plurality of data lines may be obtained from the compressed journal. In some embodiments, the compressed journal or portions of the compressed journal may be decompressed prior to obtaining the data.

Process 700 then proceeds to decision block 704, where a determination is made whether the obtained data is a feature. In some embodiments, data may be determined to be a feature based on an identifier, such as "New." However, other embodiments envisage a plurality of other techniques for identifying whether the data is a feature, including, for example, whether the data is so identified as a feature using a 'feature' tag, or other identifier. If the obtained data is a feature, then processing flows to block 706; otherwise processing flows to decision block 710. At block 706 the feature is recorded in a corresponding metadata file. In some embodiments, the feature may be recorded in one or more metadata files. In one embodiment, the feature may be recorded in a separate metadata file based on a feature type. For example, one metadata file may include a host feature; another metadata file may include a source feature; or the like. An example illustration of a plurality of metadata files is described below in conjunction with FIG. 9.

Process 700 proceeds next to block 708, where the features are maintained as archive metadata for subsequent event data. In one embodiment, the archive metadata may be temporarily stored until process 700 returns and/or the archive data is updated. Processing then flows to decision block 716.

At decision block 704, however, if the data is determined not to be a feature, then process 700 flows to decision block 710 where a determination is made whether the obtained data is event data. In one embodiment, data may be determined to be event data based on an identifier, such as an identifier called "Event." Thus, in one embodiment, data succeeding the identifier "Event" in the compressed journal may be event data. If the obtained data is event data, then processing flows to block 714; otherwise processing flows to block 712.

At block 714, a search index may be updated based on the obtained event data and archived metadata. In one embodiment, the archived metadata is related to the obtained event data. In one embodiment, the archived metadata may be transcribed into one or more metadata codes that correspond to metadata stored in one or more metadata files, such as generated by block 706. Similarly, the search index may include a keyword associated with the event and an event location offset, such as a UELO, to where the event is stored in the compressed journal. Thus, in some embodiments, the search index may be updated with a UELO and one or more metadata codes. Processing flows next to decision block 716.

At decision block 710, if the obtained data is not event data, then process 700 flows to block 712 where the obtained data is maintained as archive metadata for subsequent event data. In one embodiment, the obtained data may be a change to the metadata. Thus, in one embodiment, a portion of the archive metadata may be updated to include the obtained data. Processing then continues to decision block 716.

At decision block 716, a determination is made whether the compressed file has been completely read. If the compressed file is not finished being read, then process 700 loops to block 703; otherwise, process 700 returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Non-Exhaustive, Non-Limiting Example Illustrations

Figure 8:
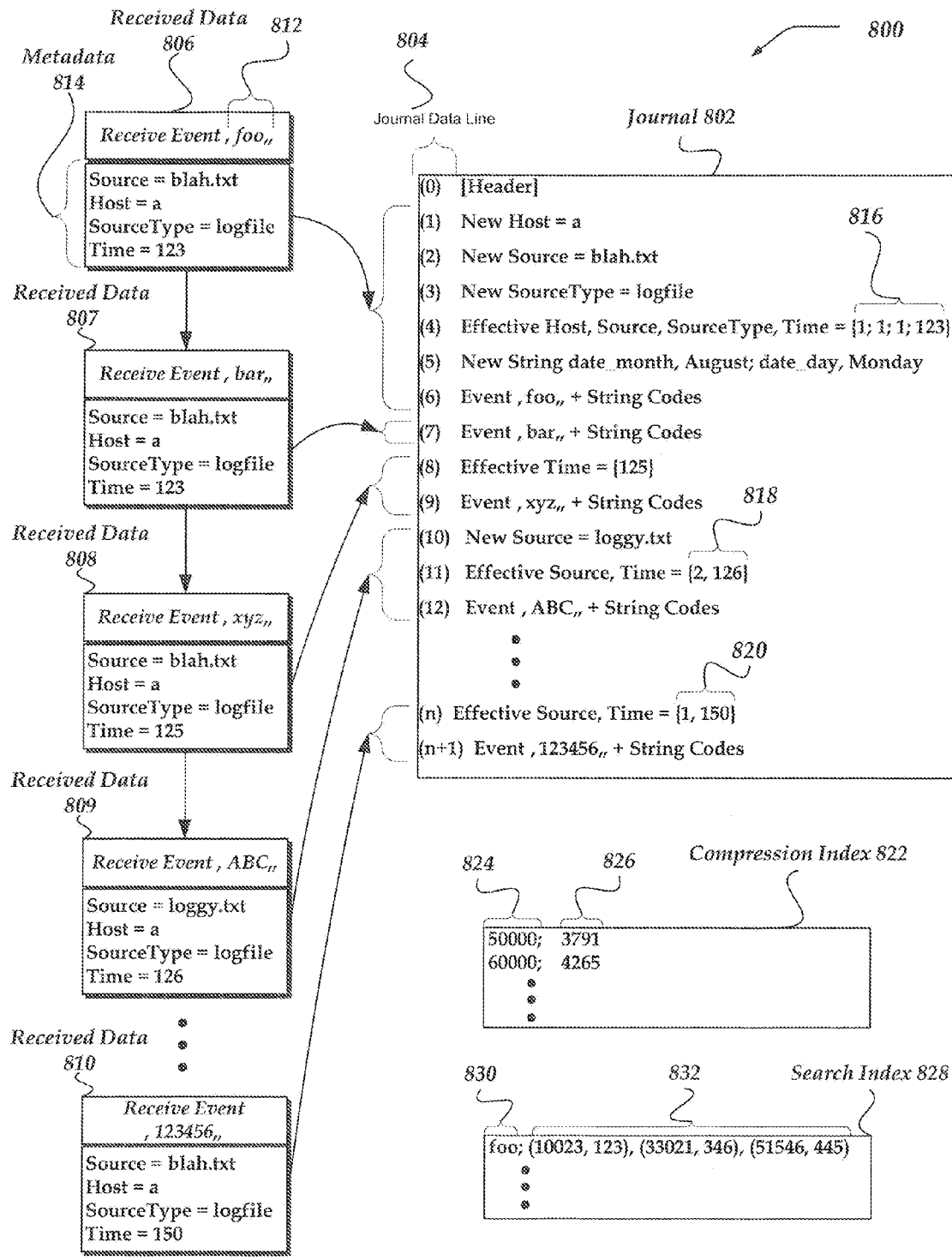
FIG. 8 shows one example of an embodiment for generating a compressed journal, such as that shown in FIG. 4.

FIG. 8 shows one example of an embodiment of generating a journal, such as that shown in FIG. 4. Example 800 includes journal 802, received data 906-910, compression index 822, and search index 828. Journal 802 may include journal data lines 804. In some embodiments, explicitly identified journal data lines 804 might not be included in journal 802. However, for ease of illustrative purposes, journal data lines 804 are shown in FIG. 8.

In some embodiments, journal 802 may include a header, such as at line 0 of journal 802. In one embodiment, the header may include information about journal 802, such as a size of journal 802, user defined settings, or the like.

Journal 802 may be generated from received data 806-810. Received data 806-810 may include event data and related metadata, such as event data 812 and metadata 814 for received data 806. In some embodiments, metadata 814 may include a plurality of features. Thus, in one embodiment, received data 807-810 may include event data and related metadata in a similar format to received data 806. In one embodiment, metadata 814 may include features a "Source," a "Host," a "Source Type," and a "Time." Metadata 814 examples should not be construed as being exhaustive or limiting; rather, metadata 814 illustrates one example of metadata relating to event data that characterizes the event data.

A determination may be made whether metadata 814 for received data 806 includes previously unwritten features, such as is described at decision block 404 of FIG. 4. As illustrated, metadata 814 includes all previously unwritten features. Thus, the features of metadata 814 may be recorded in journal 802, such as is described at block 406 of FIG. 4, and that is illustrated at lines 1-3 of journal 802. As the features are recorded, one or more metadata files may be generated and/or updated to include the features, such as described at block 414 of FIG. 4. An example illustration of a plurality of metadata files is described below in conjunction with FIG. 9. Briefly, however, in some embodiments, the one or more metadata files may include a feature code, indicia, or other identifier that corresponds to the metadata. For example, Host "a" is the first host feature that is recorded in this example. Thus, a host feature file may be generated and/or updated to include host "a" and a corresponding code, such as host code "1." Other metadata files may be generated and/or updated in a similar manner.

The features may be recorded as effective features when the feature for an event is different from a feature associated with an immediately preceding event data, such as described at block 407 of FIG. 4, and that is illustrated at line 4 of journal 802. Effective feature codes 816 may include feature codes, or indices, of the effective features that may be stored in metadata files and or an index of features. In some embodiments, time may be a direct entry without a corresponding code. Additionally, effective feature codes 816 may be stored as one or more variables, which may be used to compare the features related to subsequent events. Thus, effective feature codes 816 may include host code "1," source code "1," source type code "1," and time "123." Where, host code "1" corresponds to host "a," source code "1" corresponds to source "blah.txt," and source type code "1" corresponds to source type "log file." Received data 806 may also include other metadata (not shown), such as string arguments, which may be recorded in journal 802, as illustrated at line 5.

Additionally, event 812 is recorded in journal 802, such as described at block 412 of FIG. 4, and that is illustrated at line 6 of journal 802. In some embodiments, string codes may be employed to identify an associated string argument for the event data, such as illustrated at line 6 of journal 802. In one embodiment, string codes may include an identifier/value pair, such as, for example, (1, 2) for "date_month=August." However, other embodiments for the string codes may also be employed. Thus, the invention is not to be construed as being constrained to any particular string code format. Moreover, in some embodiments, the string codes may be based on one or more metadata files that are updated as data is received and recorded in the compressed journal, such as described at block 414 of FIG. 4.

When an event is recorded in journal 802, search index 828 may be updated, such as described at optional block 504 of FIG. 5. Search index 828 may include keyword 830 and one or more UELOs 832. In some embodiments, each UELO may include a timestamp of the event and/or metadata codes (not shown) associated with the event. Additionally, after data is recorded in journal 802, compression index 822 may be updated in include UELO 824 and a CELO 826 as described at block 512 of FIG. 5.

Received data 807-810 may be recorded in journal 802 in a manner similar to received data 806, such as by employing process 400 of FIG. 4. As received data 807 is received, a determination may be made whether the related metadata for received data 807 includes any previously unwritten features. As illustrated, received data 807 does not contain any previously unwritten features (e.g. lines 1, 2, and 3 of journal 802). Thus, a determination may be made whether the related metadata data for received data 807 has different related metadata features than received data 806 (e.g. metadata 814), such as described at decision block 408 of FIG. 4. As illustrated, received data 807 contains identical metadata features as the immediately preceding event data, e.g. received data 806. Thus, the metadata features may be ignored and event data from received data 807 may be recorded in journal 802 at line 7.

At a subsequent time, received data 808 is received. As illustrated, the "Time" metadata has changed. As a result, a change in the "Time" is recorded in journal 802, such as described at block 407 of FIG. 4, and that is illustrated at line 8 of journal 802. Additionally, event data from received event 808 may be recorded in journal 802 (shown at line 9 of journal 802).

As illustrated, received data 809 may include previously unwritten features, such as new "Source" feature. As a result, the previously unwritten feature and an effective feature may be recorded in journal 802, such as shown at lines 10-11 of journal 802. Effective feature codes 818 may include source code "2," which corresponds to the new source "loggy.txt." Again, the metadata codes, such as source code "2" may be recorded in one or more metadata files. Additionally, event data from received event 809 may be recorded in journal 802 (shown at line 12 of journal 802).

Moreover, received data 810 is another illustration of recording data in journal 802. Received data 810 may include different metadata features than the metadata features of received data 809, such as source "blah.txt." As a result, the effective feature can be recorded in journal 802, such as shown at lines n of journal 802. Effective feature codes 820 may include source code "1," which corresponds to the previously recorded source "blah.txt." Again, the metadata codes, such as source code "1" may be recorded and accessible in one or more metadata files. In this illustration, a source metadata file may provide source code "1" because it was previously record when line 2 of journal 802 was recorded. Additionally, event data from received event 810 may be recorded in journal 802 (shown at line n+1 of journal 802).

Figure 9:
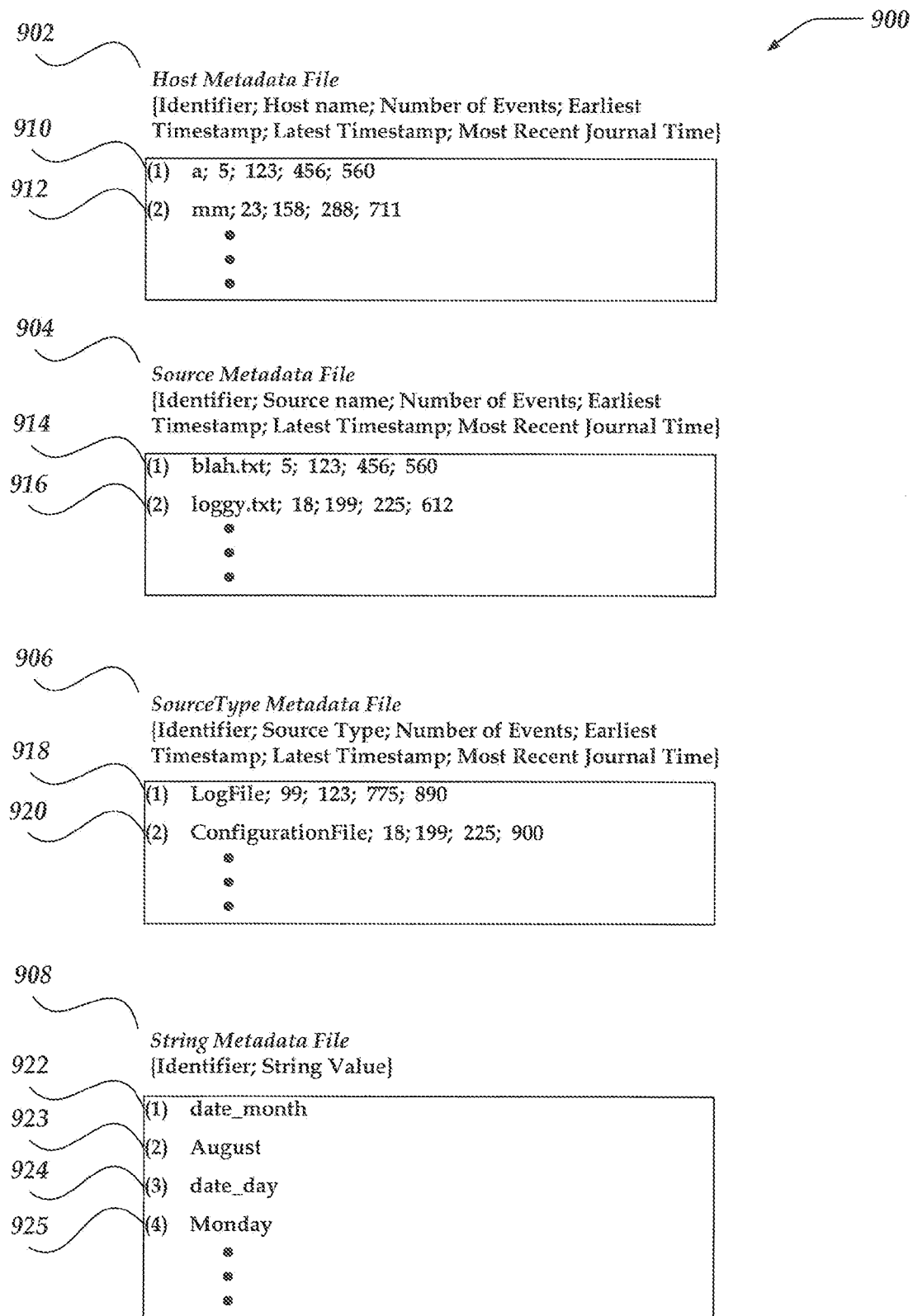
FIG. 9 shows one example of an embodiment illustrating one or more metadata files.

FIG. 9 shows one non-limiting, non-exhaustive example of an embodiment illustrating a plurality of metadata files. Metadata files 900 may include host metadata file 902, source metadata file 904, source type metadata file 906, and string metadata file 908. Although not illustrated, other metadata files may also be created and/or otherwise employed. Host metadata file 902 may include code 910 and code 912. Code 910 and code 912 may include an identifier, a corresponding host name, a number of events that are related to that metadata, an earliest timestamp of a recorded event, a latest timestamp of a recorded event, a most recent time the metadata was written to the journal, or the like. In one embodiment, the identifier may correspond to a line number within host metadata file 902. In another embodiment, the identifier may be a recorded host code number. Although two host codes are shown (code 910 and 912), the invention is not so limited; rather, a plurality of codes may be recorded in the one or more metadata files.

In some embodiments, a line number and/or other identifier may be implemented as a code, which may be utilized in a compressed journal, such as journal 802 of FIG. 8 and in a search index, such as search index 830 of FIG. 8. For example, code 910, which is at line 1, may correspond to host "a." Thus, the compressed journal and/or search index reference may stored host code 1 to represent host "a" (such as described with reference to received data 806 and changed metadata 816 of FIG. 8).

Source metadata file 904 may include code 914 and code 916. Code 914 and code 916 may include an identifier, a corresponding source name, a number of events that are related to that metadata, an earliest timestamp of a recorded event, a latest timestamp of a recorded event, a most recent time the metadata was written to the journal, or the like. In one embodiment, the identifier may correspond to a line number within source metadata file 904. In another embodiment, the identifier may be a recorded source code number. Similar to host metadata file 902, the identifier may be implemented as a code for use in other files. Although two source codes are shown (code 914 and 916), the invention is not so limited; rather, a plurality of codes may be recorded in the one or more metadata files.

Source type metadata file 906 may include code 918 and code 920. Code 918 and code 920 may include an identifier, a corresponding source type, a number of events that are related to that metadata, an earliest timestamp of a recorded event, a latest timestamp of a recorded event, a most recent time the metadata was written to the journal, or the like. In one embodiment, the identifier may correspond to a line number within source type metadata file 906. In another embodiment, the identifier may be a recorded source type code number. Similar to host metadata file 902, the identifier may be implemented as a code for use in other files. Although two source type codes are shown (code 918 and 920, the invention is not so limited; rather, a plurality of codes may be recorded in the one or more metadata files.

String metadata file 908 may include codes 922-925. Codes 922-925 may include an identifier and a value that correspond to a string argument. In one embodiment, the identifier may correspond to a line number within string metadata file 908 (as shown in FIG. 9). In another embodiment, the identifier may be a recorded string code number. Moreover, in still other embodiments, codes 922-925 may include string codes that correspond to user defined metadata and/or annotations. Moreover, codes 922-925 may include other metadata that may be recorded with event data in a compressed journal, such as shown at line 6 of journal 802 of FIG. 8. Although four string codes are shown (codes 922-925), the invention is not so limited; rather, a plurality of codes may be recorded in the one or more metadata files.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method, comprising:
  receiving raw data on a computing device;
  determining boundaries that divide the raw data into a set of events;
  assigning a time stamp to each event in the set of events;
  identifying a subset of events in the set of events;
  compressing the raw data that includes the subset of events;
  storing the compressed raw data that includes the subset of events;
  determining a compression offset for the compressed raw data that includes the subset of events, wherein the compression offset indicates a location of the compressed raw data that includes the subset of events;
  storing the compression offset in a compression index;
  associating one or more uncompressed offsets with the compression offset, wherein each uncompressed offset includes information for identifying one of the events in the raw data that includes the subset of events;
  receiving an indication to retrieve a particular event in the subset of events;
  using the compression index to identify the compression offset indicating the location of the compressed raw data that includes the particular event; and
  using the compression offset and an associated uncompressed offset to locate the particular event.

2. The method of claim 1, wherein using the compression offset and the associated uncompressed offset to locate the particular event further comprises:

retrieving the compressed raw data that includes the subset of events containing the particular event from the location specified by the compression offset; and decompressing the compressed raw data that includes the subset of events containing the particular event.

3. The method of claim 1, wherein using the compression offset and the associated uncompressed offset to locate the particular event further comprises:

retrieving the compressed raw data that includes the subset of events containing the particular event from the location specified by the compression offset;

decompressing the compressed raw data that includes the subset of events containing the particular event; and using the uncompressed offset to locate the particular event in the raw data that includes the subset of events, wherein the uncompressed offset is applied to the raw data obtained by decompressing the compressed raw data.

4. The method of claim 1, further comprising:

identifying a second subset of events in the set of events;

compressing the raw data associated with the second subset of events;

storing the compressed raw data associated with the second subset of events;

determining a compression offset for the compressed raw data associated with the second subset of events, wherein the compression offset for the compressed raw data associated with the second subset of events indicates a location of the compressed raw data associated with the second subset of events; and storing the compression offset for the compressed raw data associated with the second subset of events in the compression index.

5. The method of claim 1, further comprising:

storing in a search index a set of keywords and a set of associated uncompressed offsets, wherein each uncompressed offset includes information for identifying an event that contains the associated keyword in the raw data that includes the subset of events;

receiving a selection of a keyword; and retrieving from the search index an uncompressed offset for identifying an event that contains the selected keyword.

6. The method of claim 1, wherein storing the compressed raw data that includes the subset of events comprises storing the compressed raw data in a journal.

7. A computer-implemented system, comprising:

one or more processors; and one or more non-transitory computer-readable storage mediums containing instructions configured to cause the one or more processors to perform operations including:

receiving raw data;

determining boundaries that divide the raw data into a set of events;

assigning a time stamp to each event in the set of events;

identifying a subset of events in the set of events;

compressing the raw data that includes the subset of events;

storing the compressed raw data that includes the subset of events;

determining a compression offset for the compressed raw data that includes the subset of events, wherein the compression offset indicates a location of the compressed raw data that includes the subset of events;

storing the compression offset in a compression index;

associating one or more uncompressed offsets with the compression offset, wherein each uncompressed offset includes information for identifying one of the events in the raw data that includes the subset of events;

receiving an indication to retrieve a particular event in the subset of events;

using the compression index to identify the compression offset indicating the location of the compressed raw data that includes the particular event; and using the compression offset and an associated uncompressed offset to locate the particular event.

8. The system of claim 7, wherein using the compression offset and the associated uncompressed offset to locate the particular event further comprises:

retrieving the compressed raw data that includes the subset of events containing the particular event from the location specified by the compression offset; and decompressing the compressed raw data that includes the subset of events containing the particular event.

9. The system of claim 7, wherein using the compression offset and the associated uncompressed offset to locate the particular event further comprises:

retrieving the compressed raw data that includes the subset of events containing the particular event from the location specified by the compression offset;

decompressing the compressed raw data that includes the subset of events containing the particular event; and using the uncompressed offset to locate the particular event in the raw data that includes the subset of events, wherein the uncompressed offset is applied to the raw data obtained by decompressing the compressed raw data.

10. The system of claim 7, wherein the one or more non-transitory computer-readable storage mediums contain further instructions configured to cause the one or more processors to perform operations including:

identifying a second subset of events in the set of events;

compressing the raw data associated with the second subset of events;

storing the compressed raw data associated with the second subset of events;

determining a compression offset for the compressed raw data associated with the second subset of events, wherein the compression offset for the compressed raw data associated with the second subset of events indicates a location of the compressed raw data associated with the second subset of events; and storing the compression offset for the compressed raw data associated with the second subset of events in the compression index.

11. The system of claim 7, wherein the one or more non-transitory computer-readable storage mediums contain further instructions configured to cause the one or more processors to perform operations including:

storing in a search index a set of keywords and a set of associated uncompressed offsets, wherein each uncompressed offset includes information for identifying an event that contains the associated keyword in the raw data that includes the subset of events;

receiving a selection of a keyword; and retrieving from the search index an uncompressed offset for identifying an event that contains the selected keyword.

12. The system of claim 7, wherein storing the compressed raw data that includes the subset of events comprises storing the compressed raw data in a journal.

13. A computer-program product, tangibly embodied in a non-transitory machine-readable storage medium, including instructions configured to cause a data processing apparatus to:
- receive raw data;
- determine boundaries that divide the raw data into a set of events;
- assign a time stamp to each event in the set of events;
- identify a subset of events in the set of events;
- compress the raw data that includes the subset of events;
- store the compressed raw data that includes the subset of events;
- determine a compression offset for the compressed raw data that includes the subset of events, wherein the compression offset indicates a location of the compressed raw data that includes the subset of events;
- store the compression offset in a compression index;
- associate one or more uncompressed offsets with the compression offset, wherein each uncompressed offset includes information for identifying one of the events in the raw data that includes the subset of events;
- receive an indication to retrieve a particular event in the subset of events;
- use the compression index to identify the compression offset indicating the location of the compressed raw data that includes the particular event; and
- use the compression offset and an associated uncompressed offset to locate the particular event.

14. The computer-program product of claim 13, wherein using the compression offset and the associated uncompressed offset to locate the particular event further comprises:
- retrieving the compressed raw data that includes the subset of events containing the particular event from the location specified by the compression offset; and
- decompressing the compressed raw data that includes the subset of events containing the particular event.

15. The computer-program product of claim 13, wherein using the compression offset and the associated uncompressed offset to locate the particular event further comprises:
- retrieving the compressed raw data that includes the subset of events containing the particular event from the location specified by the compression offset;
- decompressing the compressed raw data that includes the subset of events containing the particular event; and
- using the uncompressed offset to locate the particular event in the raw data that includes the subset of events, wherein the uncompressed offset is applied to the raw data obtained by decompressing the compressed raw data.

16. The computer-program product of claim 13, further including instructions configured to cause the data processing apparatus to:
- identify a second subset of events in the set of events;
- compress the raw data associated with the second subset of events;
- store the compressed raw data associated with the second subset of events;
- determine a compression offset for the compressed raw data associated with the second subset of events, wherein the compression offset for the compressed raw data associated with the second subset of events indicates a location of the compressed raw data associated with the second subset of events; and
- store the compression offset for the compressed raw data associated with the second subset of events in the compression index.

17. The computer-program product of claim 13, further including instructions configured to cause the data processing apparatus to:
- store in a search index a set of keywords and a set of associated uncompressed offsets, wherein each uncompressed offset includes information for identifying an event that contains the associated keyword in the raw data that includes the subset of events;
- receive a selection of a keyword; and
- retrieve from the search index an uncompressed offset for identifying an event that contains the selected keyword.

18. The computer-program product of claim 13, wherein storing the compressed raw data that includes the subset of events comprises storing the compressed raw data in a journal.

* * * * *